L. E. JONES.
CULTIVATOR.
APPLICATION FILED SEPT 12, 1914.
1,191,006.
Patented July 11, 1916.
2 SHEETS—SHEET 1.
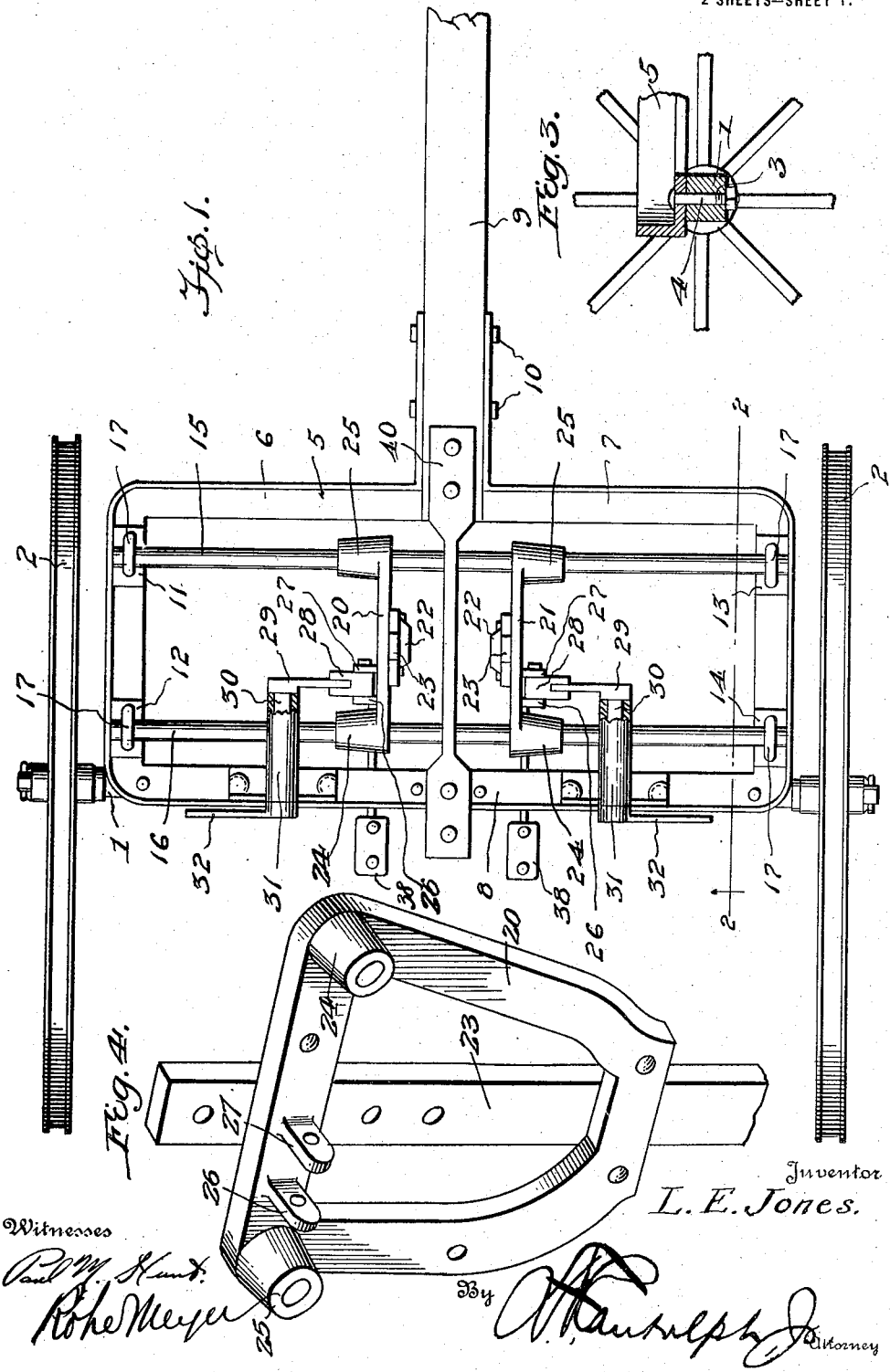
Witnesses
Inventor
L. E. Jones.
By
Attorney

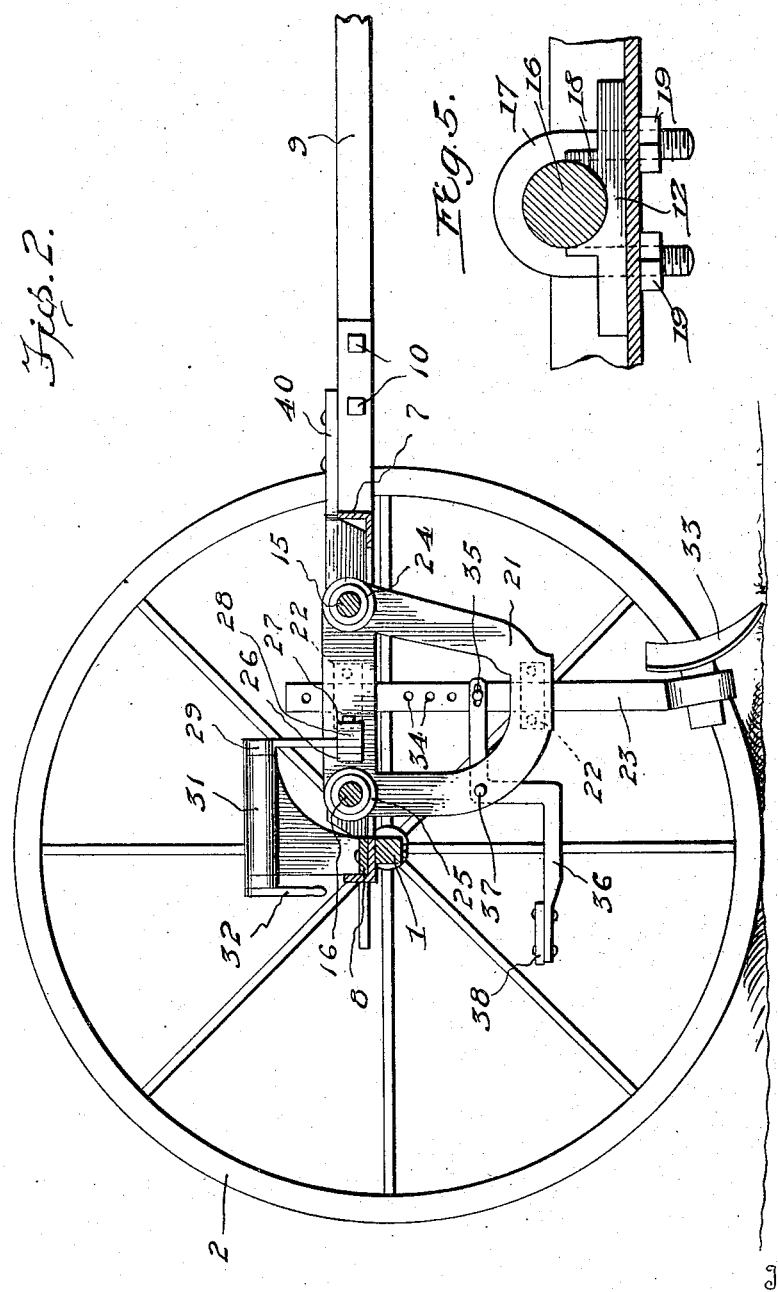

UNITED STATES PATENT OFFICE.

LEWIS E. JONES, OF BONNEAU, SOUTH CAROLINA.

CULTIVATOR.

1,191,006.　　　　Specification of Letters Patent.　　Patented July 11, 1916.

Application filed September 12, 1914. Serial No. 861,347.

*To all whom it may concern:*

Be it known that I, LEWIS E. JONES, a citizen of the United States, residing at Bonneau, in the county of Berkeley and State of South Carolina, have invented certain new and useful Improvements in Cultivators; and I do hereby declare the following to be a full, clear, and exact description of the invention, such as will enable others skilled in the art to which it appertains to make and use the same.

This invention relates to cultivators, and the primary object of the invention is the provision of a cultivator which embodies cultivating shovel carrying beams which are adjustable vertically and horizontally of the cultivator frame upon the manipulation of a pair of levers for adjusting the shovel to accommodate various features arising in the cultivation of grain.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a plan view of the improved cultivator. Fig. 2 is a cross sectional view on the line 2—2 of Fig. 1. Fig. 3 is a detail view of the shovel carrying beam supporting bracket. Fig. 4 is a detail view of the manner of connecting the supporting frame of the cultivator to the axle thereof, and, Fig. 5 is a detail sectional view of a part of the cultivator construction.

Referring more particularly to the drawings, 1 designates the traction wheel carrying axle of the cultivator, which has traction wheels 2 mounted upon the spindle ends thereof. The axle 1 of the cultivator is provided with openings 3, through which bolts 4 are inserted. The bolts 4 are also inserted through spaced openings formed in the rear longitudinal side of a rectangular frame 5, which frame is constructed of angled arms. The frame construction includes two sections 6 and 7, which have the ends of their rear sides facing each other and connected by a bar 8. The forward end of the sections 6 and 7 are bent transversely to the length thereof and have a tongue 9 of the ordinary construction securely attached thereto in any suitable manner such as by bolts 10.

The ends of the frame 5 have bearings or pillow blocks 11, 12, 13 and 14 secured to the upper surface of the horizontal portions thereof, which pillow blocks receive the ends of rods 15 and 16. The rod 15 has its terminal ends mounted in the pillow blocks 11 and 13 while the rod 16 has its ends mounted in the pillow blocks 12 and 14. The rods 15 and 16 are held for rotation within the bearings formed in the pillow blocks by U-shaped bolt 17, which have the terminal ends of the legs thereof screw threaded for receiving nuts. The U-shaped bolt 17 is placed so that the vertexes thereof will encompass the upper half of the rods 15 and 16 and bind them within the bearings 18 formed in the pillow block. The legs of the U-shaped bolt 17 extend through openings formed in the horizontal portion of the ends of the frame 5 and are held securely in position by nuts 19 which are adjustably mounted upon the screw threaded terminals of the bolt. The rods 15 and 16 have supported thereby plow beam supporting brackets 20 and 21, which brackets have auxiliary guiding brackets 22 secured thereto for permitting of vertical movement of the plow beams 23, which are held connected to the supporting brackets 20 and 21 by the guiding bracket 22. The brackets 20 and 21 have transversely extending cuffs 24 and 25 formed thereupon through which the rods 15 and 16 extend. The brackets 20 and 21 have transversely projecting ears 26 and 27 formed thereon intermediate of the cuffs 24 and 25, and projecting in the same direction as the cuffs, to which brackets are pivotally connected links 28 which have their outer ends bifurcated for receiving the ends of secondary links 29. The secondary links 29 are secured to the ends of rock shafts 30. The rock shafts 30 are supported above the frame 5 by bearing brackets 31. The ends of the rock shafts opposite to the ones upon which the links 29 are mounted have levers 32 connected thereto for the manual rocking or rotating of the rock shaft for moving the cuffs 24 and 25 and consequently the supporting bracket members 20 and 21 longitudinaly upon the rods 15 and 16 for spacing them laterally with respect to each other and consequently spacing the shovels 33 which are carried by the lower end of the shovel carrying beams 23 in spaced relation with each other.

The shovel carrying standards 23 are provided with a plurality of openings 34, one of which is provided for receiving pins 35 for connecting the shovel carrying beams to levers 36. The levers 36 are pivoted as at 37 to the brackets 20 and 21 and they have foot pedals 38 secured to their outer ends which project beyond the rear edge of the rectangular farme 5. The tongue 9 has one end of a bracing bar 40 secured thereto, which bracing bar extends rearwardly and has its rear end connected to the rear side of the supporting frame 5 and is provided for the attachment thereto of a seat supporting spring (not shown). The bracing bar 40 is provided with openings (not shown) through which the rods 15 and 16 extend.

From the foregoing description taken in connection with the accompanying drawings the advantages of the construction and of the method of operation of the improved cultivator will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a cultivator, an axle, a substantially rectangular frame having the rear side thereof secured to said axle, rods carried by said frame and extending transversely across the same, brackets adjustable along the length of said rods and supported thereby, rock shafts rockably supported by said rectangular farme and pivotally connected to said brackets, levers connected to said rock shaft whereby said brackets will be moved longitudinally upon said rods upon the rocking of said shafts, cultivator shovel carrying beams adjustably carried by said bracket.

2. In a cultivator, an axle, a substantially rectangular frame having the rear side thereof secured to said axle, rods carried by said frame and extending transversely across the same, brackets adjustable along the length of said rods and supported thereby, rock shafts rockably supported by said rectangular frame and pivotally connected to said brackets, levers connected to said rock shafts whereby said brackets will be moved transversely upon said rods upon the rocking of said shafts, cultivator shovel carrying beams carried by said bracket, said cultivator shovel carrying beams being provided with a plurality of spaced openings, levers connected to said shovel carrying beams and pivotally connected to said brackets, whereby said shovel carrying beams will be adjusted vertically upon the pivotal movement of said levers.

3. In a cultivator structure, the combination, of an axle, a rectangular frame having its rear side attached to said axle, a pair of spaced rods extending transversely across said frame, a pair of substantially U-shaped brackets having horizontal bearing bosses formed upon and extending transversely from the upper ends of the legs of said brackets, said bosses being slidably mounted upon said rods, cross bars connecting the upper ends of the legs of said brackets, angled levers pivotally connected to said cross bars, said levers being rockably supported by said frame for shifting said brackets transversely upon the rods upon rocking movements of said levers, and cultivating shovel carrying standards carried by said brackets.

4. In a cultivator structure, the combination, of an axle, a rectangular frame having its rear side attached to said axle, a pair of spaced rods extending transversely across said frame, a pair of substantially U-shaped brackets having horizontal bearing bosses formed upon and extending transversely from the sides of the upper ends of the legs of said brackets, said bosses being slidably mounted upon said rods, cross bars connecting the upper ends of the legs of said brackets, angled levers pivotally connected to said cross bars, said levers being rockably supported by said frame for shifting said brackets transversely upon the rods upon rocking movement of said levers, brackets secured to said cross bars, cultivator shovel carrying standards slidably extending through said last named brackets, foot levers adjustably connected to said standards and pivotally connected to said U-shaped brackets for moving said standards vertically upon pivotal movement of the foot levers.

In testimony whereof I affix my signature in presence of two witnesses.

LEWIS E. JONES.

Witnesses:
J. EVA EDWARDS,
DUELLA I. EDWARDS.